US011608659B2

(12) United States Patent
Kovie et al.

(10) Patent No.: US 11,608,659 B2
(45) Date of Patent: Mar. 21, 2023

(54) VEHICLE DOOR ASSEMBLY

(71) Applicant: Nissan North America, Inc., Franklin, TN (US)

(72) Inventors: David Kovie, Livonia, MI (US); Venkata Ramana Pavan Nadella, Chennai (IN); Barathwaj Nagarajan, Chennai (IN)

(73) Assignee: NISSAN NORTH AMERICA, INC., Franklin, TN (US)

( * ) Notice: Subject to any disclaimer, the term of this patent is extended or adjusted under 35 U.S.C. 154(b) by 380 days.

(21) Appl. No.: 16/779,111

(22) Filed: Jan. 31, 2020

(65) Prior Publication Data
US 2021/0238895 A1 Aug. 5, 2021

(51) Int. Cl.
B60J 5/00 (2006.01)
E05B 77/04 (2014.01)
B60J 5/04 (2006.01)

(52) U.S. Cl.
CPC .............. E05B 77/04 (2013.01); B60J 5/042 (2013.01); B60J 5/0433 (2013.01); B60J 5/0456 (2013.01); E05Y 2900/531 (2013.01)

(58) Field of Classification Search
CPC ............................ B60J 5/0433; B60J 5/0456
See application file for complete search history.

(56) References Cited

U.S. PATENT DOCUMENTS 7,568,744 B2   8/2009  Tenorio et al.
7,648,192 B2   1/2010  Herline et al.
8,414,038 B2   4/2013  Bedekar et al.
8,955,257 B2   2/2015  Moriya et al.
2004/0080179 A1*  4/2004  Okazaki .............. B60R 21/0428
                                                         296/146.6

(Continued)

FOREIGN PATENT DOCUMENTS

CN    107304646 A    10/2017
EP     2581246 A1     4/2013

(Continued)

OTHER PUBLICATIONS

U.S. Appl. No. 16/457,374; Door Lock Assembly for a Vehicle Door Panel; Contreras; filed Jun. 28, 2019.

Primary Examiner — Daniel J Troy
Assistant Examiner — Daniel Alvarez
(74) Attorney, Agent, or Firm — Global IP Counselors, LLP

(57) ABSTRACT

A door has a latch mechanism, a reinforcement bracket and a jamming bracket within a cavity of the door. The latch mechanism retains the door in a closed orientation and in response to operation of the latch mechanism the door is released for movement to an open orientation. The reinforcement bracket is fixedly attached to structures of the vehicle door. The jamming bracket is fixed to the reinforcement bracket and has a locking portion that extends to an area adjacent to a release lever of the latch mechanism. With the door in a non-deformed state, the release lever is movable between a door opened orientation and a door closed orientation. In response to deformation of the door resulting from an exterior impact force, the locking portion of the jamming bracket moves toward the release lever preventing the release lever from moving to the door opened orientation.

12 Claims, 9 Drawing Sheets

(56) References Cited

U.S. PATENT DOCUMENTS

2019/0136583 A1* 5/2019 Gray ................ E05B 77/04
2019/0284845 A1* 9/2019 Fraley ................ B60J 5/04

FOREIGN PATENT DOCUMENTS

| EP | 2174812 B1 | 5/2014 | | |
|---|---|---|---|---|
| JP | 2017193911 A | 10/2017 | | |
| WO | WO-2016113475 A1 * | 7/2016 | ............ | B60J 5/0433 |

* cited by examiner

VEHICLE DOOR ASSEMBLY

BACKGROUND

Field of the Invention

The present invention generally relates to a vehicle door assembly. More specifically, the present invention relates to vehicle door assembly that includes structure that limits operation of a door latch mechanism in response to an impact event.

Background Information

Vehicles are continuously being re-designed and modified to change responses to impact events.

SUMMARY

One object of the present disclosure is to provide a vehicle door assembly with structure that limits operation of a door latch mechanism in response to an impact event.

In view of the state of the known technology, one aspect of the present disclosure is to provide a vehicle door assembly with an outer door panel, an inner door panel, a door latch mechanism, a reinforcement bracket and a jamming bracket. The inner door panel has an outer periphery fixed to a corresponding outer periphery of the outer door panel defining a cavity therebetween. The outer door panel and the inner door panel are fixed to one another at least partially defining a vehicle door therebetween. The door latch mechanism is configured to retain the vehicle door in a closed orientation. Further, in response to movement of a release lever of the door latch mechanism to a predetermined orientation the vehicle door is released for movement to an open orientation. The reinforcement bracket has a first end fixedly attached to an upper area of the inner door panel and a second end attached to a rearward area of the inner door panel within the cavity adjacent to the door latch mechanism. The jamming bracket is fixed to the reinforcement bracket and has a locking portion that extends to an area adjacent to the release lever. With the vehicle door in a non-deformed state, the release lever is movable between an at rest orientation and the predetermined orientation. In response to deformation of the vehicle door resulting from an exterior impact force the locking portion of the jamming bracket moves toward the release lever preventing the release lever from moving to the predetermined orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
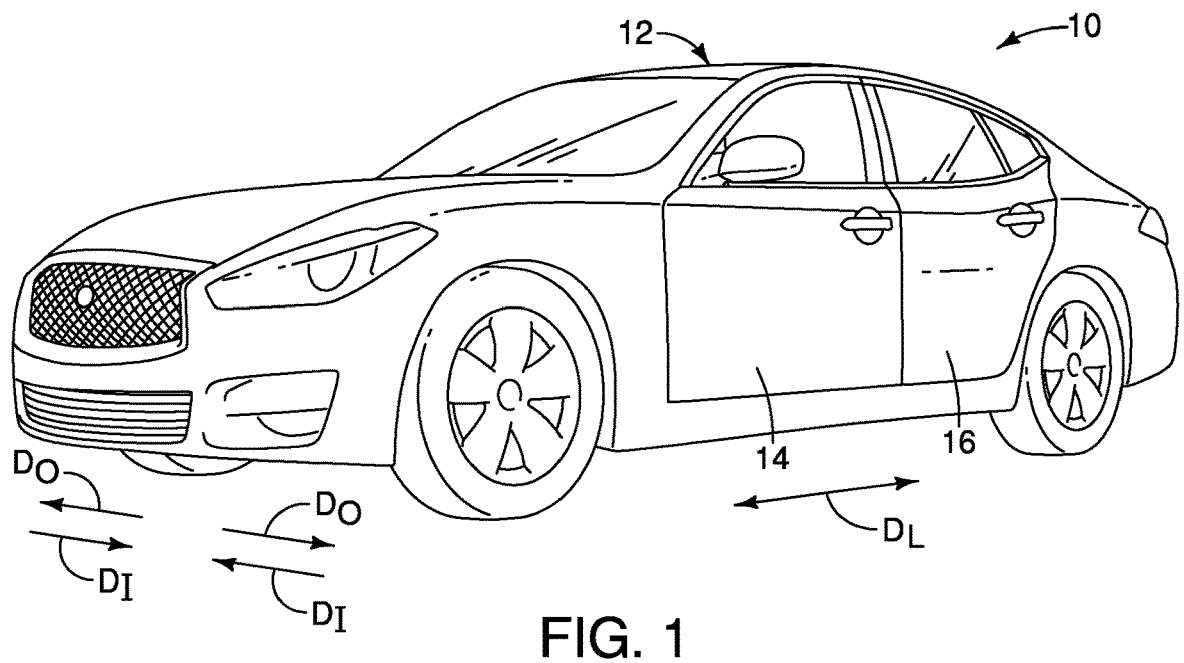
FIG. 1 is a perspective view of a vehicle that includes a vehicle door assembly in accordance with a depicted embodiment.

Referring initially to FIG. 1, a vehicle 10 is illustrated in accordance with a first embodiment. The vehicle 10 includes a vehicle body structure 12 with front doors 14 and rear doors 16 (a vehicle door assembly). The front doors 14 and rear doors 16 are configured to move between a closed orientation, as shown in FIG. 1, to an open orientation (not shown) in a conventional manner.

As shown in FIG. 1, a plurality of differing directions is defined relative to the vehicle 10. Those directions include: a vehicle longitudinal direction $D_L$; a vehicle inboard direction $D_I$; and a vehicle outboard direction $D_O$. The vehicle inboard direction $D_I$ and the vehicle outboard direction $D_O$ are defined relative to an imaginary center line of the vehicle 10, where the imaginary center line extends in the vehicle longitudinal direction $D_L$ of the vehicle 10. Reference to inboard and outboard directions in the following description are with respect to the above listed vehicle directions.

The vehicle 10 is depicted as a four dour sedan. However, the vehicle 10 can be any of a variety of vehicle designs, such as a crew cab pickup truck, an SUV (sports utility vehicle) or other four door vehicle design.

Figure 2:
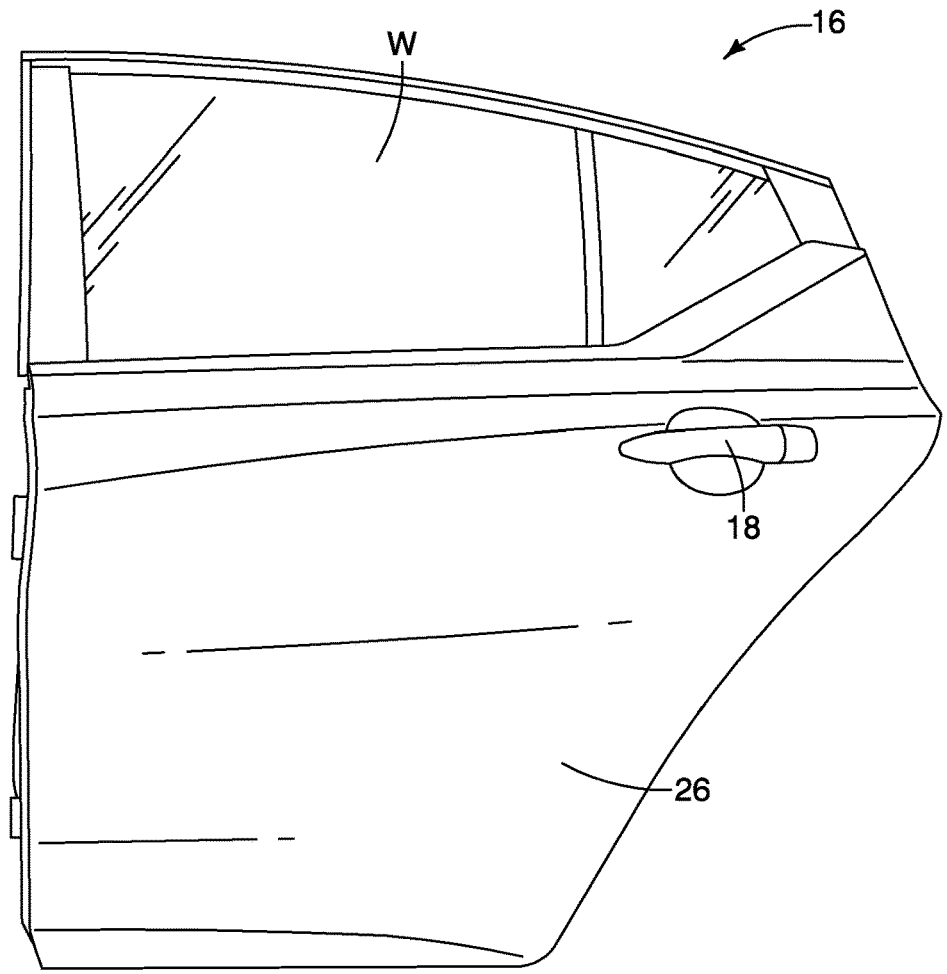
FIG. 2 is a side view of the vehicle door assembly removed from the vehicle in accordance with the depicted embodiment.

One of the rear doors 16 is shown removed from the vehicle 10 in FIG. 2. For the sake of brevity, only one of the rear doors 16 is described herein below. However, the description below of features of the rear door 16 applies equally to both rear doors 16. Further, the structure described herein below can also be applied and used in the front doors 14.

Figure 3:
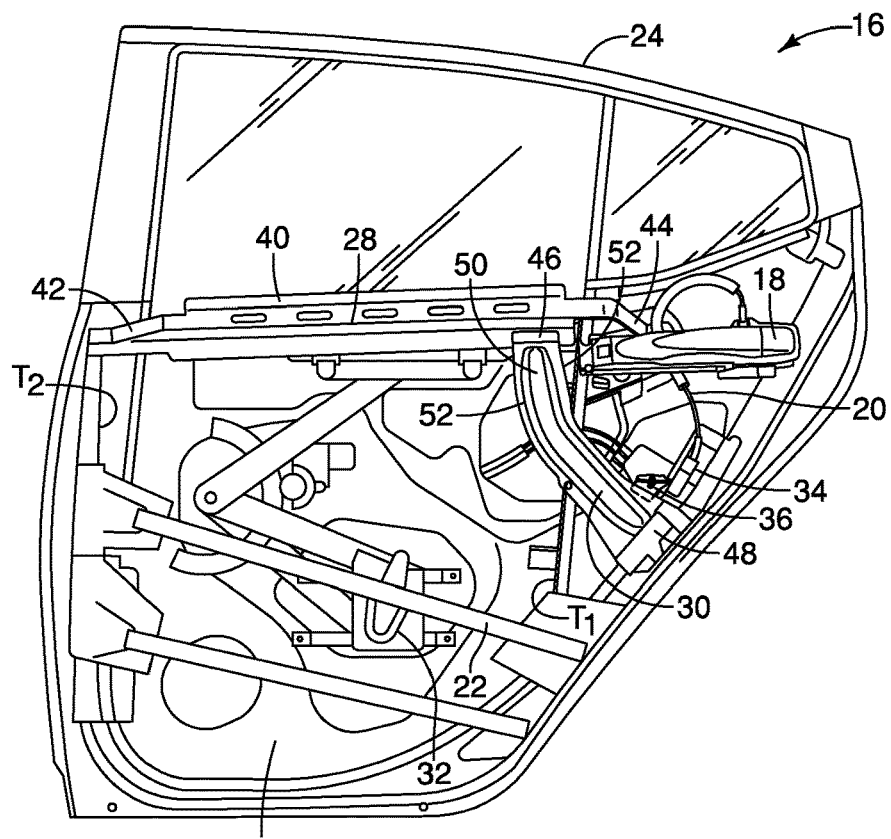
FIG. 3 is another side view of the vehicle door assembly similar to FIG. 2 with an outer door panel removed showing features in a hollow interior or cavity within the door assembly, including a main reinforcement beam (or bracket), a first reinforcement beam (or bracket), a door latch mechanism, a door handle assembly and a jamming bracket in accordance with the depicted embodiment.

As shown in FIG. 3, the rear door 16 includes a door handle assembly 18, a cable assembly 20, a lower beam 22, an inner door panel 24, an outer door panel 26, a main reinforcement beam 28, a first reinforcement beam 30, a window regulator mechanism 32, a latch mechanism 34 and a jamming bracket 36.

The door handle assembly 18 installed to the inner door panel 24 in a conventional manner and is operably connected to the latch mechanism 34 via the cable assembly 20. The door handle assembly 18 is manually operated in a conventional manner to operate the latch mechanism 34 to open the rear door 16 from outside the vehicle 10. An interior door handle assembly (not shown) is similarly installed to an inboard surface (not shown) of the inner door panel 24 and the latch mechanism 34 to open the rear door 16 from the passenger compartment of the vehicle 10. Since operation of door handle assemblies and corresponding cables is conventional technology, further description is omitted for the sake of brevity.

The lower beam 22 has a front end fixedly attached to a forward end of the inner door panel 24 within the cavity H via, for example, any one of a variety of welding techniques. A rearward end of the lower beam 22 is fixedly attached to a rearward end of the inner door panel 24 within the cavity H via, for example, any one of a variety of welding techniques, as shown in FIG. 3. The lower beam 22 is located below the first reinforcement beam 30 and the latch mechanism 34. Another lower beam is included in the rear door 16 beneath the lower beam 22.

Figure 4:
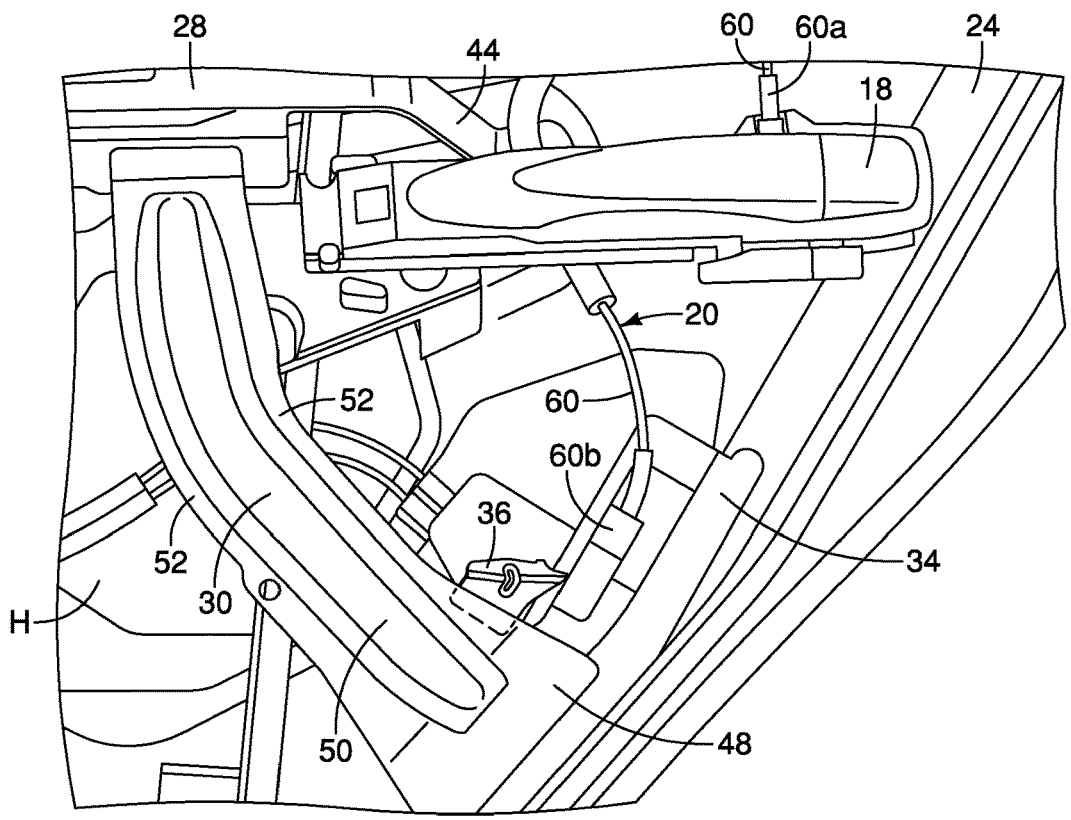
FIG. 4 is another side view of the vehicle door assembly showing details of the main reinforcement beam, the first reinforcement beam, the door latch mechanism, the door handle assembly and the jamming bracket in accordance with the depicted embodiment.

As shown in FIGS. 3 and 4, the inner door panel 24 defines a hollow recessed area or cavity H that is concealed with the outer door panel 26 attached to the inner door panel 24 and the door 16 fully assembled. It should be understood from the drawings and the description herein that the inner door panel 24 and the outer door panel 26 are rigidly fixed to one another along their respective outer peripheries in a conventional manner. For example, an outer periphery of the inner door panel 24 can fixed to a corresponding outer periphery of the outer door panel 26 via any of a variety of welding techniques. The cavity H is further defined as the space between the inner door panel 24 and the outer door panel 26.

The main reinforcement beam 28 (also referred to herein below as a main reinforcement bracket) is now described with reference to FIGS. 3 and 4. The main reinforcement beam 28 has an upper edge 40, a first end 42 and a second end 44. The upper edge 40 extends along a lower end of a window opening and at least partially defines a slot (not shown) for window glass W. More specifically, with the door 16 fully assembled, the slot (not show) receives the glass window W which supported between window tracks $T_1$ and $T_2$ and by the window regulator mechanism 32 in a conventional manner. As the window regulator mechanism 32 is operated, the glass window W is moved up and down along the tracks $T_1$ and $T_2$ that extend through the slot in a conventional manner.

The first end 42 of the main reinforcement beam 28 is fixed to a forward area of the inner door panel 24 by welding techniques. Similarly, the second end 44 of the main reinforcement beam 28 is fixed to a rearward area of the inner door panel 24 by welding techniques. Hence, the main reinforcement beam 28 is rigidly and fixedly attached to the inner door panel 24.

The first reinforcement beam 30 (also referred to as a first reinforcement bracket) is basically a curved beam having an upper end 46, a lower end 48, a reinforcement rib 50 and longitudinal flanges 52. The upper end 46 of the first reinforcement beam 30 is welded or otherwise rigidly and fixedly attached to the main reinforcement beam 28 forward of the track $T_1$ of the window regulator mechanism 32 and rearward of an approximate center of the main reinforcement beam 28. The first reinforcement beam 30 extends downward from the main reinforcement beam 28 and rearward curving toward a rearward edge of the inner door panel 24. The lower end 48 is welded or otherwise rigidly and fixedly attached a rearward portion of the inner door panel 24 below the latch mechanism 34. A mid-section of the first reinforcement beam 30 is located outboard of the track $T_1$ of the window regulator mechanism 32.

Figure 5:
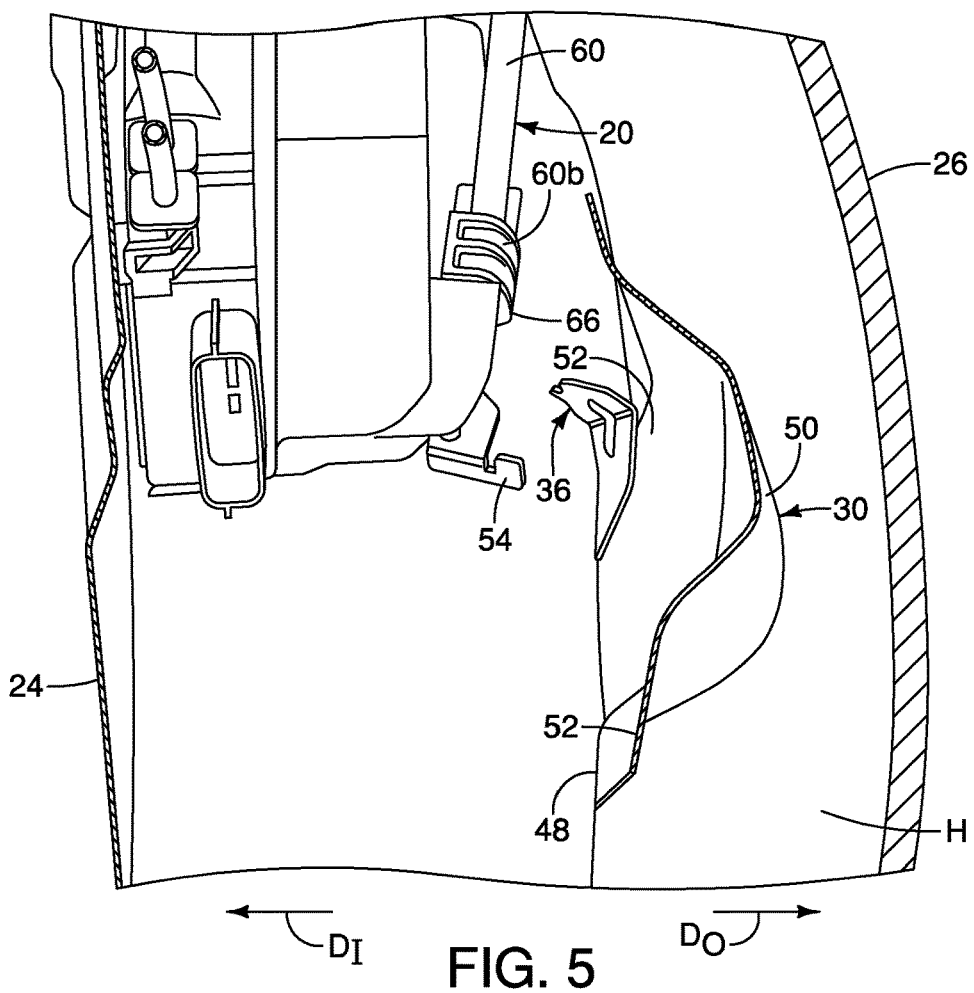
FIG. 5 is a front view (looking rearward) of the latch mechanism, the first reinforcement beam and the jamming bracket in a non-impacted state showing the jamming bracket spaced apart from an operating lever of the latch mechanism in accordance with the depicted embodiment.

The window regulator mechanism 32 includes a crank (not shown) or motorized mechanism that is operated by a vehicle passenger to move the window glass W up and down along the window tracks $T_1$ and $T_2$. The window tracks $T_1$ and $T_2$ are fixedly installed to the inner door panel 24 in a conventional manner and are parallel to one another. The window track $T_1$ is located rearward of the window track $T_2$. The window tracks $T_1$ and $T_2$ are also located within the cavity H. The rearward window track $T_1$ is also disposed between an outboard surface of the inner door panel 24 and the first reinforcement beam 30 within the cavity H. As shown in FIGS. 4 and 5, the upper end 46 of the first reinforcement beam 30 is located forward of the window track $T_1$ and the lower end 48 of the first reinforcement beam 30 is located rearward of the window track $T_1$.

Figure 6:
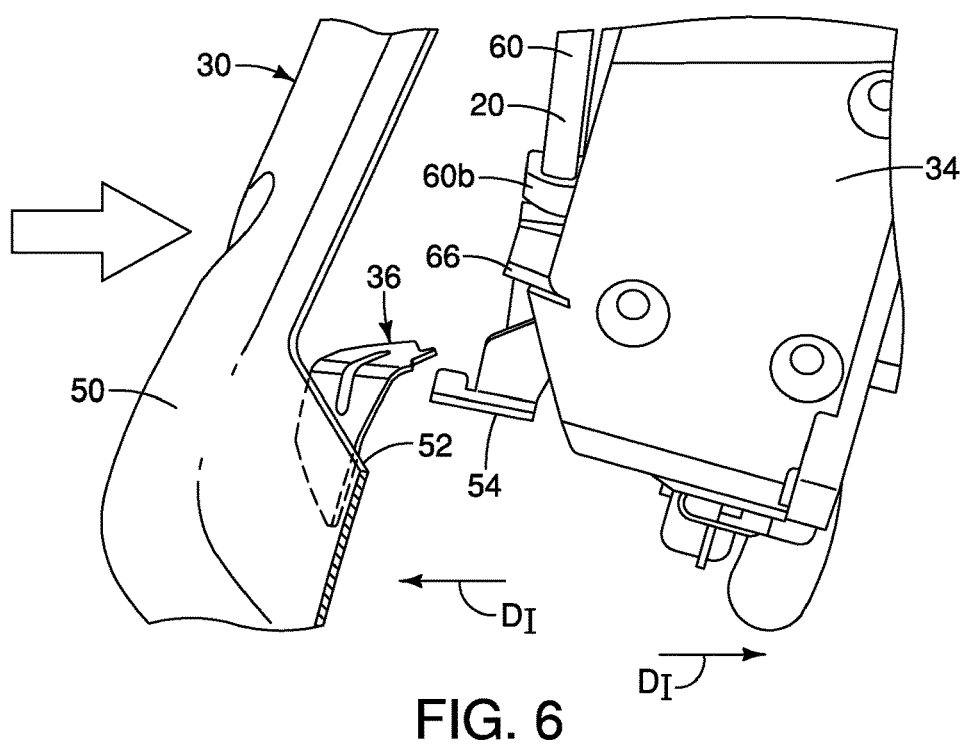
FIG. 6 is a rear view (looking forward) of the latch mechanism, the first reinforcement beam and the jamming bracket in the non-impacted state showing the jamming bracket spaced apart from an operating lever of the latch mechanism in accordance with the depicted embodiment.

The latch mechanism 34 is rigidly fixed via mechanical fasteners (not shown) to the inner door panel 24 within the cavity H in a conventional manner, as shown in FIGS. 5 and 6. The latch mechanism 34 includes internal parts that engage a door striker (not shown) that is rigidly attached to the vehicle body structure 12 in a rearward area of the rear door opening in a conventional manner. The latch mechanism 34 includes an external lever 54 that engages the internal parts of the latch mechanism 34. More specifically, the latch mechanism 34 is configured to release the door striker in response to upward movement of the external lever 54 causing the internal parts of the latch mechanism 34 to release the door striker and open the rear door 16.

The cable assembly 20 can be, for example, a Bowden cable that includes an outer sleeve 60 and a wire 62 that extends through a hollow core of the outer sleeve 60. One end 60a of the outer sleeve 60 is non-movably attached to the door handle assembly 18 as shown in FIG. 4 and the other end 60b of the outer sleeve 60 is non-movably attached to a flange 66 of the latch mechanism 34, as shown in FIGS. 4, 5 and 6.

Figure 7:
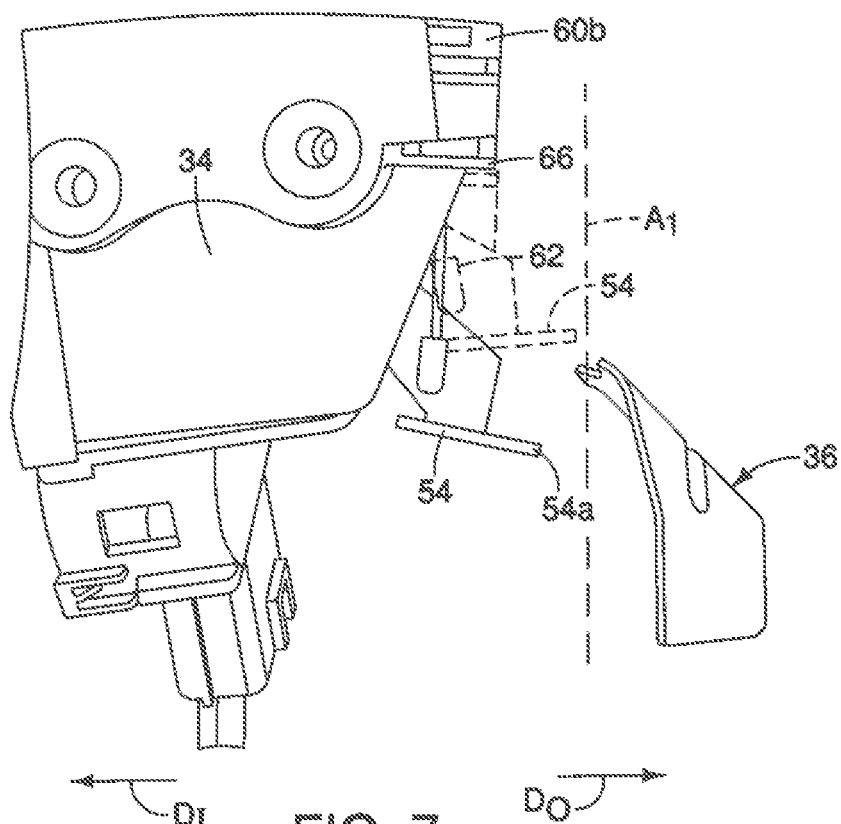
FIG. 7 is another front view of the latch mechanism, the first reinforcement beam and the jamming bracket the lever of the latch mechanism in a door closed orientation in solid lines and the lever of the latch mechanism in a door opened orientation in phantom lines along with the jamming bracket, the movement between the door closed orientation and the door open orientation defining a movement path for the lever in accordance with the depicted embodiment.

When the door handle of the door handle assembly 18 is pulled, force is applied to the wire 62 of the cable assembly 20. The wire 62 is connected to the lever 54 of the latch mechanism 34, as shown in FIG. 7. Movement of the wire 62 causes the lever 54 to move from an at rest orientation (door closed orientation) as shown in solid lines in FIG. 7, and a door release orientation (door opened orientation), as shown in phantom lines in FIG. 7.

The jamming bracket 36 is positioned within the rear door 16 to make use of the movement of the lever 54 in order to prevent opening of the rear door 16 during an impact event. Specifically, when an impacting force is applied to the rear door 16 along or adjacent to the location of the first reinforcement beam 30, or any location on the outer panel 26 of the rear door 16 that might cause deformation of the first reinforcement beam 30, the jamming bracket 36 can move in a movement path defined by movement of the lever 54 of the latch mechanism 34.

As shown in FIG. 7, the lever 54 is movable between the at rest orientation (a lower position shown in solid lines) and a door opened orientation (an upper position shown in phantom or dashed lines). The lever 54 is also referred to as a release lever 54. The jamming bracket 36 is fixedly attached to the first reinforcement beam 30 at a predetermined location. Specifically, if an impact event causes deformation of the first reinforcement beam 30, the jamming bracket 36 moves to a location above the at rest orientation of the lever 54, thereby preventing the lever 54 from moving to the door opened orientation, as is explained in greater detail below. FIG. 7 also shows an imaginary upright axis $A_1$ that is described in greater detail below. The imaginary upright axis $A_1$ is also shown in FIGS. 16-23.

As shown in FIGS. 8-13 with the jamming bracket 36 removed from the rear door 16, the jamming bracket 36 is basically a metal plate that is bent to define a lower portion 70 and an upper portion 72. The lower portion 70 (a first portion) and the upper portion 72 (a second portion, also referred to as a locking portion) are angularly offset from one another by an obtuse angle that is between 95 and 130 degrees. The specific angle is only necessary so that an area of the upper portion 72 (the locking portion) is moved above the lever 54 in response to deformation of the outer door panel 26 and the first reinforcement beam 30, preventing the lever 54 from moving to its upper orientation (the door opened orientation). In the depicted embodiment, the lower portion 70 and the upper portion 72 define an angle of approximately 110 degrees therebetween.

Figure 8:
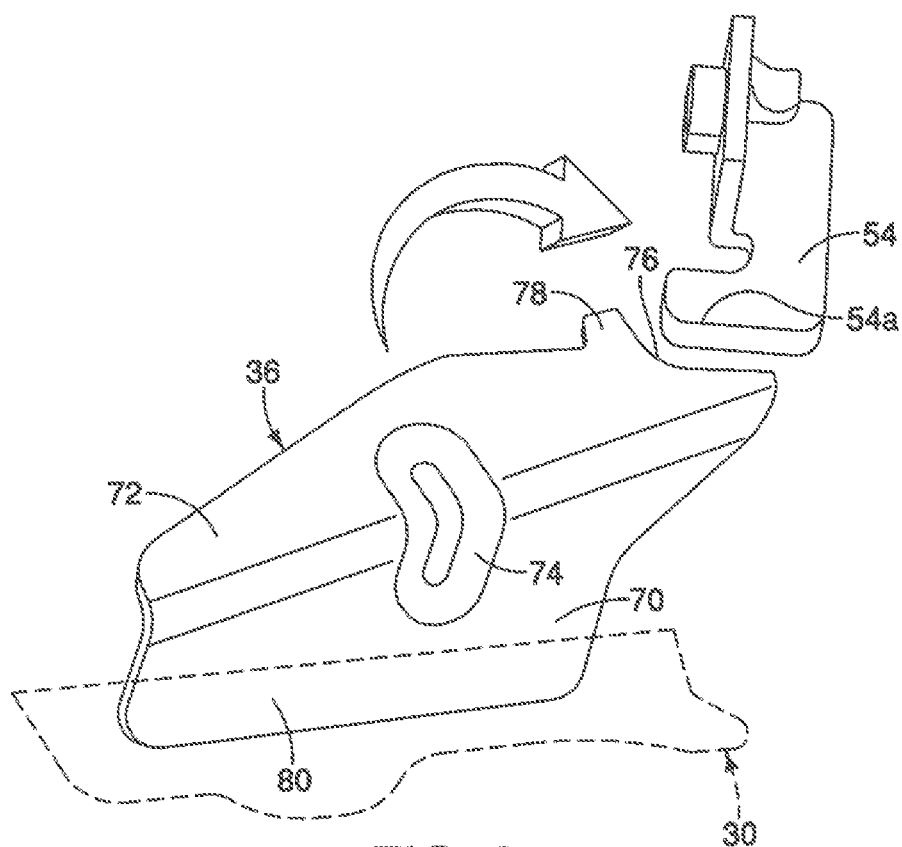
FIG. 8 is a perspective side view looking in an inboard direction relative to the vehicle showing the jamming bracket and the lever of the door latch mechanism in a non-impacted state in accordance with the depicted embodiment.

The jamming bracket 36 further includes a dimple or rib 74 that stiffens the jamming bracket 36. The dimple or rib 74 is also referred to as an embossment 74. The upper portion 72 includes a curved edge 76 that is shaped to correspond to the shape of an end portion 54a of the lever 54, as shown in FIG. 8. More specifically, the curved edge 76 has a concaved shape, while the end portion 54a has a convex shape. With the rear door 16 in an normal state (not deformed), the curved edge 76 is shaped and dimensioned to allow the lever 54 to move up and down between the door closed orientation (solid lines in FIG. 7) and the door opened orientation (dashed or phantom lines in FIG. 7). The upper portion 72 further includes a projection 78 formed adjacent to the curved edge 76. With the jamming bracket 36 installed to the first reinforcement beam 30, the projection 78 extends in the inboard direction $D_I$ from the remainder of the upper portion 72 of the jamming bracket 36.

Figure 9:
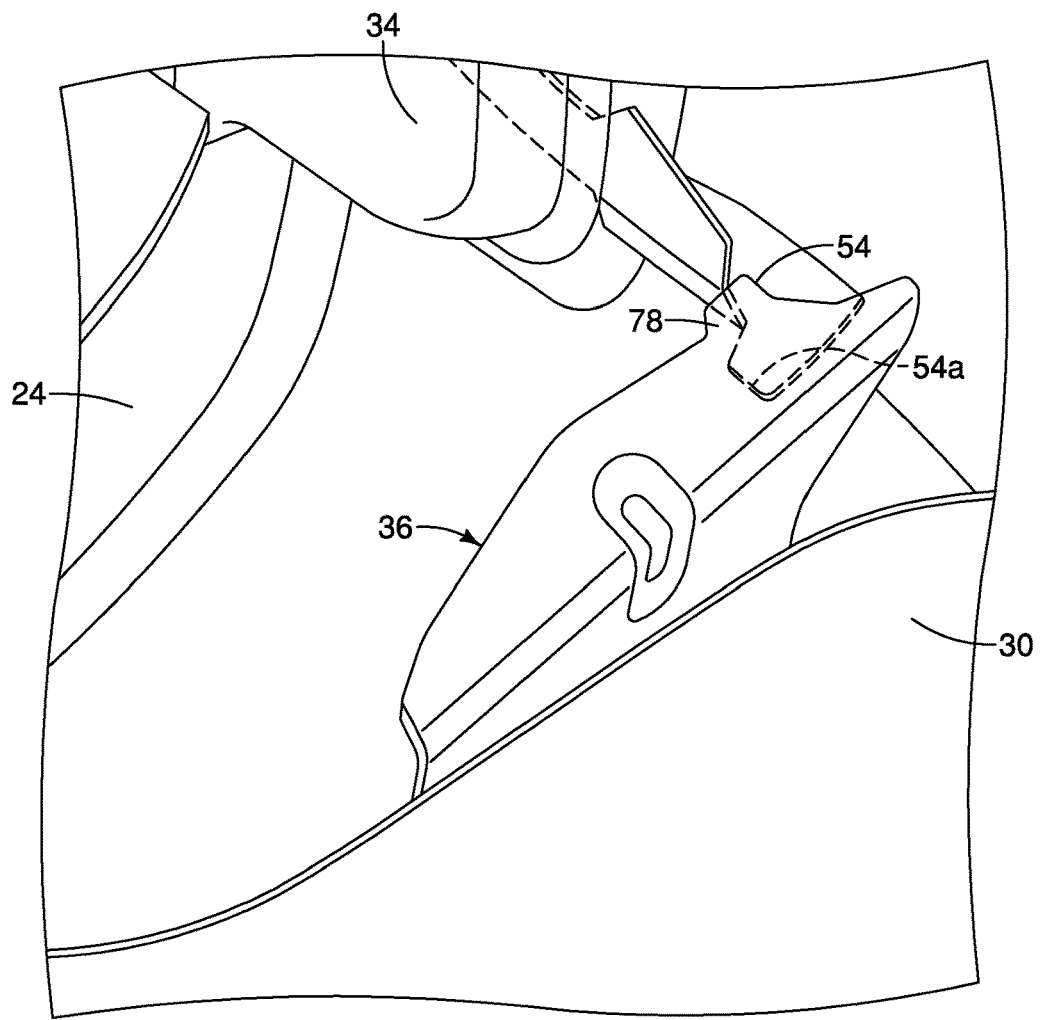
FIG. 9 is another perspective side view looking in a downward direction and an inboard direction relative to the vehicle showing the jamming bracket and the lever of the door latch mechanism in a non-impacted state in accordance with the depicted embodiment.
Figure 10:
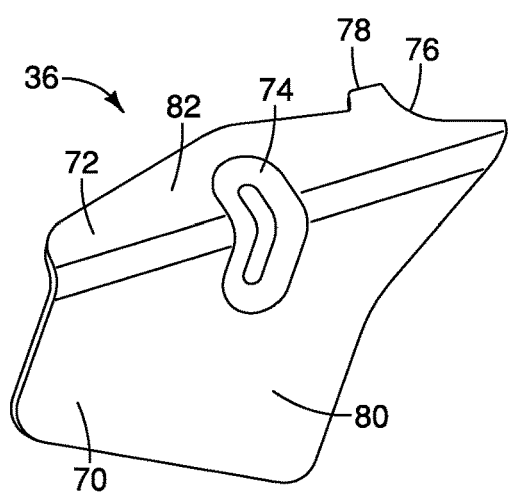
FIG. 10 is an outboard side view of the jamming bracket removed from the door assembly in accordance with the depicted embodiment.
Figure 11:
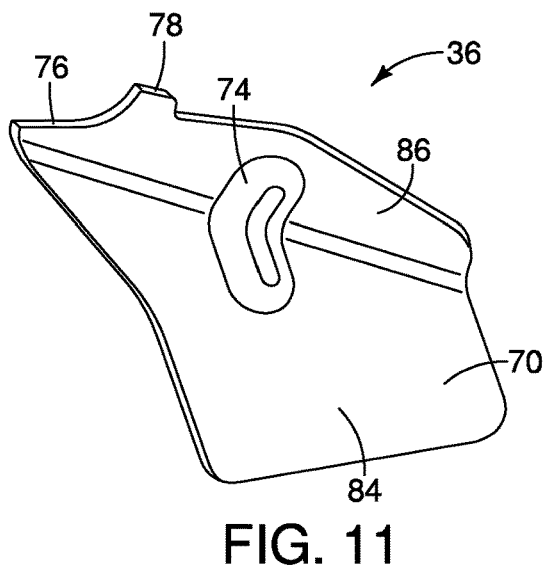
FIG. 11 is an inboard side view of the jamming bracket in accordance with the depicted embodiment.
Figure 12:
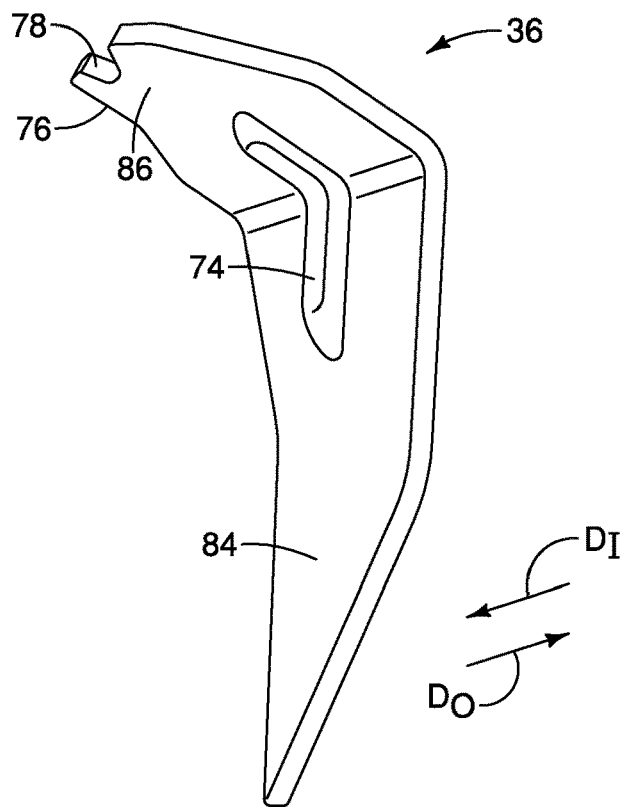
FIG. 12 is a front view of the jamming bracket in accordance with the depicted embodiment.
Figure 13:
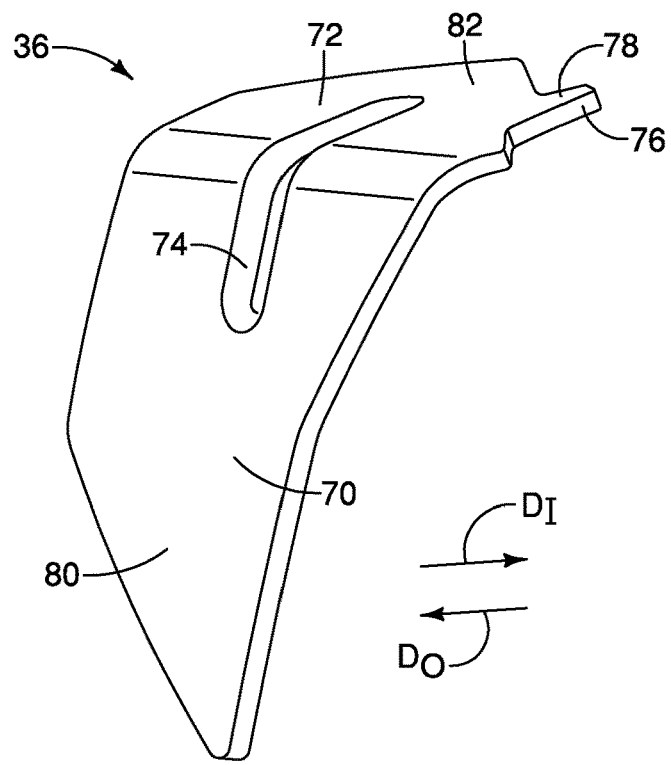
FIG. 13 is a rear view of the jamming bracket in accordance with the depicted embodiment.

The lower portion 70 defines an outboard surface 80 that is welded or otherwise rigidly fixed to an inboard surface of the first reinforcing beam 30 adjacent to the latch mechanism 34, as shown in FIGS. 4, 6 and 9. The upper portion 72 of the jamming bracket 36 defines an upwardly facing surface 82, as shown in FIGS. 8, 10 and 13. The lower portion 70 also defines an inboard surface 84, as shown in FIGS. 11 and 12. The upper portion 72 of the jamming bracket 36 defines a downwardly facing surface 86, as shown in FIGS. 11 and 12.

As shown in FIGS. 5-9, prior to receiving impacting forces F, the first reinforcement beam 30 and the jamming bracket 36 are positioned to allow movement of the lever 54 past the curved edge 76 and the projection 78 of the jamming bracket 36. Consequently, the rear door 16 can be opened and closed without interference from the jamming bracket 36.

Figure 14:
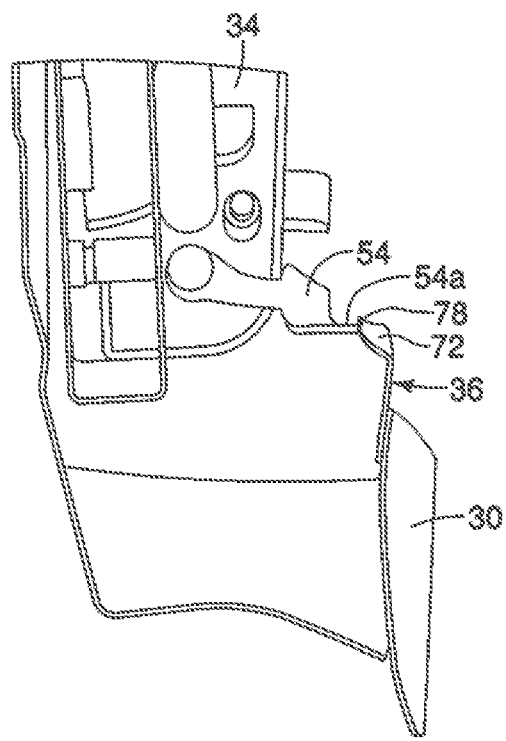
FIG. 14 is a front view of the latch mechanism, the first reinforcement beam and the jamming bracket just prior to an impact event in accordance with the depicted embodiment.
Figure 16:
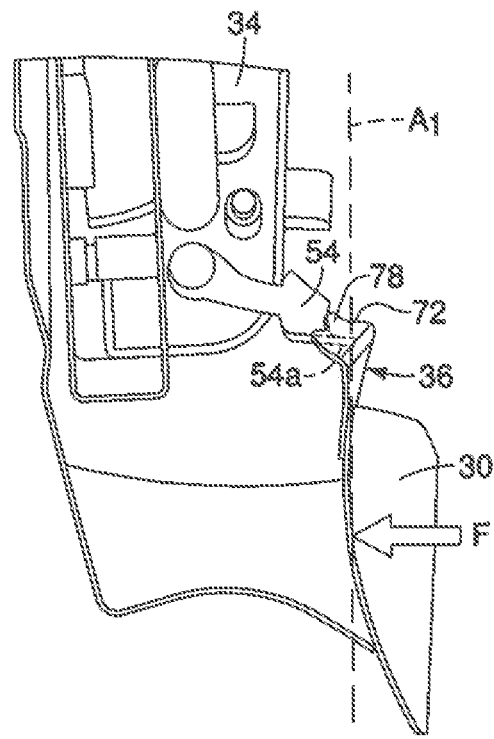
FIG. 16 is another front view of the latch mechanism, the first reinforcement beam and the jamming bracket several milli-seconds after the depiction in FIG. 15 where impacting forces cause further deformation of the first reinforcement bracket and corresponding movement of the jamming bracket over the lever of the latch mechanism in accordance with the depicted embodiment.
Figure 17:
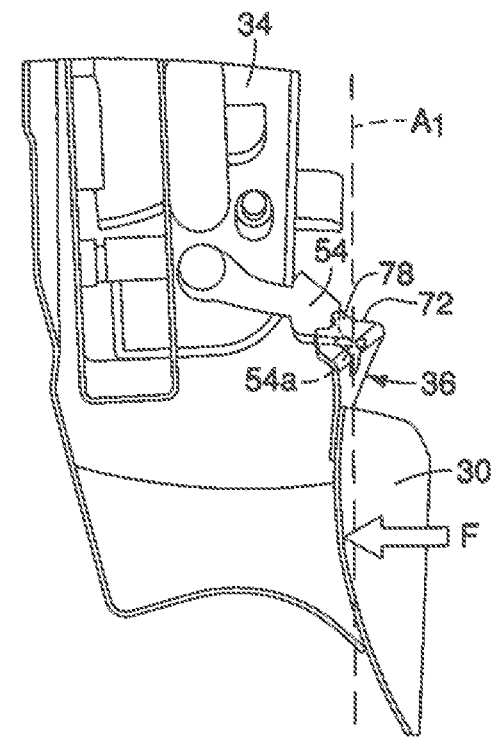
FIG. 17 is yet another front view of the latch mechanism, the first reinforcement beam and the jamming bracket several milli-seconds after the depiction in FIG. 16 in which impacting forces caused still further deformation of the first reinforcement bracket and further corresponding movement of the jamming bracket over the lever of the latch mechanism in accordance with the depicted embodiment.
Figure 18:
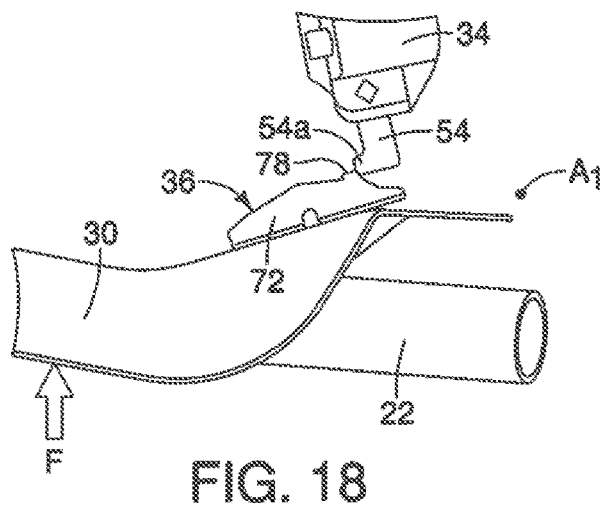
FIG. 18 is a top view of the latch mechanism, the first reinforcement beam and the jamming bracket at the beginning of the impact event with impacting forces beginning to cause deformation of the first reinforcement bracket and further cause corresponding movement of the jamming bracket over the lever of the latch mechanism in accordance with the depicted embodiment.

During an impact event when impacting forces F are applied to the outer door panel 26, the forces F can act on the first reinforcement beam 30. Specifically, the first reinforcement beam 30 can begin to move deform in response to application of the forces F, as shown in FIGS. 14 and 18. As is shown in FIGS. 14-24, deformation of the reinforcement beam 30 causes movement of the jamming bracket 36. As shown in the front views (looking rearward) during an impact event, the jamming bracket 36 is moved in the inboard direction $D_1$ toward the latch mechanism 34 and above the lever 54.

As shown in FIGS. 18-24 (top views looking downward), in addition to moving in the inboard direction $D_I$, the jamming bracket 36 also rotates in a clockwise because deformation of the first reinforcement beam 30 occurs forward from the jamming bracket 36.

The sequential images in FIGS. 14-17 and sequential images in FIGS. 18-24 occur within several milli-second of one another, showing the progress of deformation of the first reinforcement beam 30 as impacting forces F continue to act thereon, and thereby move the jamming bracket 36 accordingly.

Figure 15:
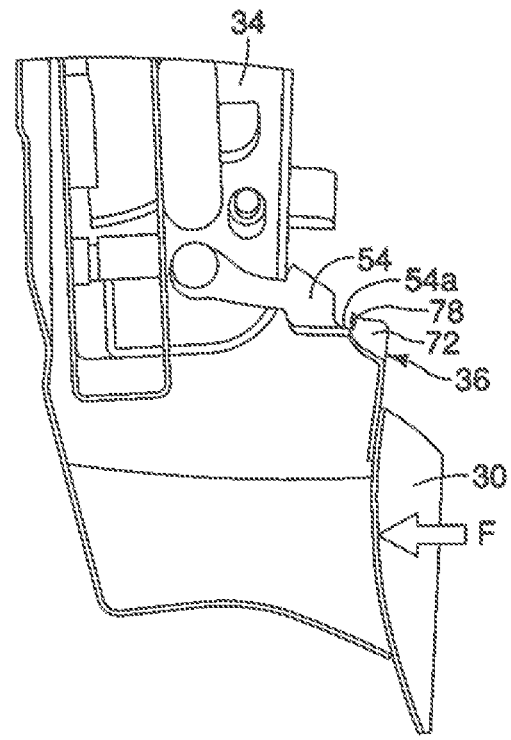
FIG. 15 is another front view of the latch mechanism, the first reinforcement beam and the jamming bracket just after the start an impact event where impacting forces cause deformation of the first reinforcement bracket and movement of the jamming bracket toward the lever of the latch mechanism in accordance with the depicted embodiment.

As shown in FIG. 14 and FIG. 18, the jamming bracket 36 begins to move to a location above the lever 54 at the start of the impact event. FIGS. 15-17 show sequential movement of the jamming bracket 36 during the impact event at intervals of between 4 to 8 milli-seconds, showing the jamming bracket 36 moving over a lower area of the lever 54 preventing the lever 54 from moving upward.

Figure 19:
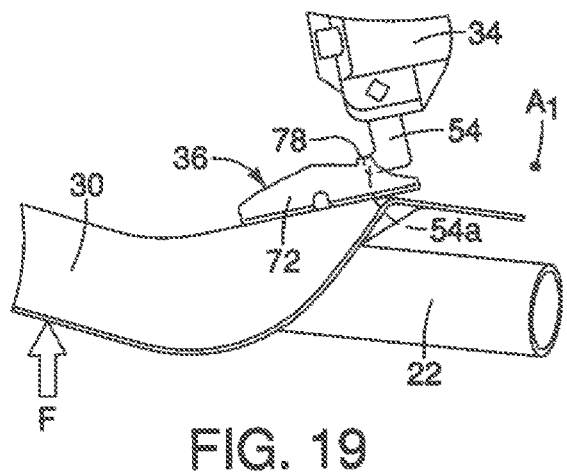
FIG. 19 is a top view of the latch mechanism, the first reinforcement beam and the jamming bracket several milli-seconds after the depiction in FIG. 18 of the impact event with impacting forces causing further deformation of the first reinforcement bracket and further causing corresponding movement of the jamming bracket over the lever of the latch mechanism in accordance with the depicted embodiment.
Figure 20:
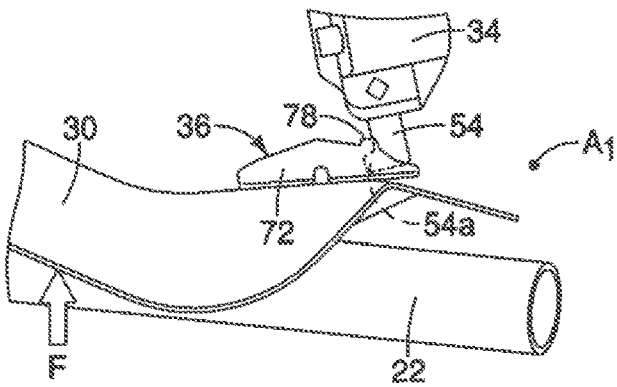
FIG. 20 is another top view of the latch mechanism, the first reinforcement beam and the jamming bracket several milli-seconds after the depiction in FIG. 19 with impacting forces continuing to cause deformation of the first reinforcement bracket and further corresponding movement of the jamming bracket over the lever of the latch mechanism in accordance with the depicted embodiment.
Figure 21:
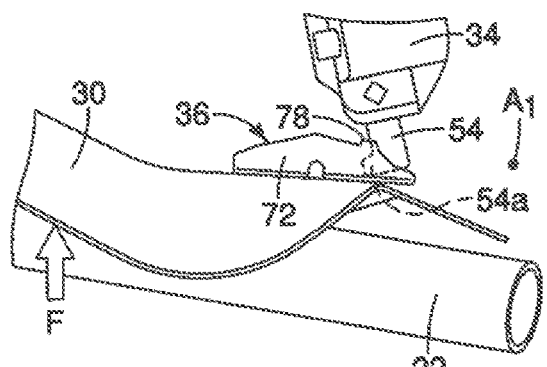
FIG. 21 is still another top view of the latch mechanism, the first reinforcement beam and the jamming bracket several milli-seconds after the depiction in FIG. 20 with impacting forces continuing to cause deformation of the first reinforcement bracket and further corresponding movement of the jamming bracket over the lever of the latch mechanism and beginning to cause rotation of the jamming bracket about an imaginary vertical axis in accordance with the depicted embodiment.
Figure 22:
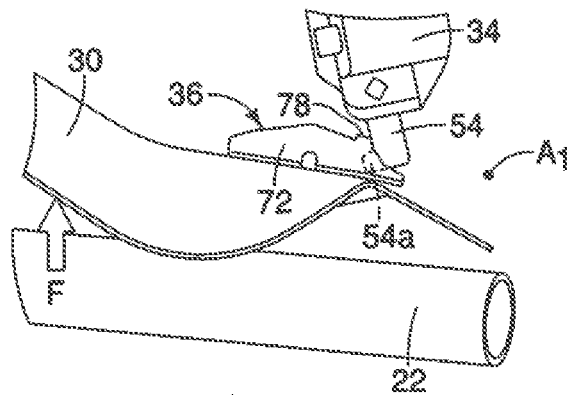
FIG. 22 is still yet another top view of the latch mechanism, the first reinforcement beam and the jamming bracket several milli-seconds after the depiction in FIG. 21 with impacting forces continuing to cause deformation of the first reinforcement bracket and further corresponding movement of the jamming bracket over the lever of the latch mechanism and causing further rotation of the jamming bracket about the imaginary vertical axis in accordance with the depicted embodiment.
Figure 23:
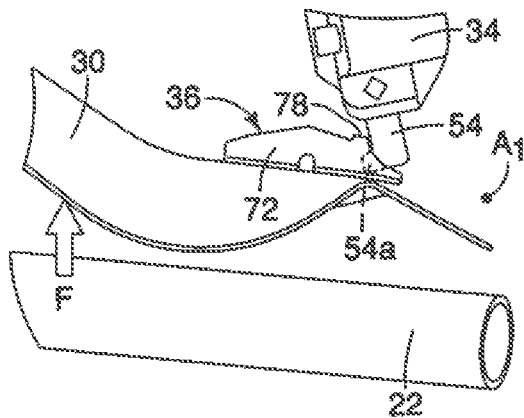
FIG. 23 is a further top view of the latch mechanism, the first reinforcement beam and the jamming bracket several milli-seconds after the depiction in FIG. 22 with impacting forces continuing to cause deformation of the first reinforcement bracket and further corresponding movement of the jamming bracket over the lever of the latch mechanism such that a projection along an inboard area of the jamming bracket engages an upright portion of the lever inhibiting further rotation of the jamming bracket and locking the lever in position due to engagement with the projection of the jamming bracket in accordance with the depicted embodiment.
Figure 24:
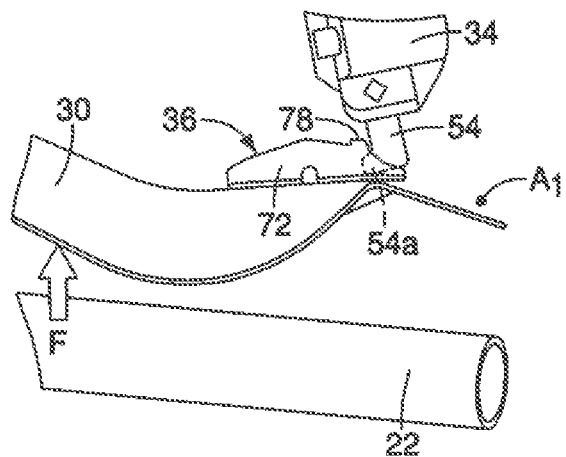
FIG. 24 is a final top view of the latch mechanism, the first reinforcement beam and the jamming bracket several milli-seconds after the depiction in FIG. 23 with impacting forces continuing to cause deformation of the first reinforcement bracket and further corresponding movement of the jamming bracket over a lower portion of the lever of the latch mechanism with the projection along an inboard area of the jamming bracket being further engaged with the upright portion of the lever inhibiting rotation of the jamming bracket and locking the lever in position due to engagement with the projection of the jamming bracket in accordance with the depicted embodiment.

Similarly, FIGS. 18-20 show sequential movement of the jamming bracket 36 during the impact event at intervals of 4 milli-seconds, and, FIGS. 21-24 show sequential movement of the jamming bracket 36 during the impact event at intervals of 10 milli-seconds, further showing the jamming bracket 36 moving over the lower area of the lever 54 and further rotating in a clockwise direction about the imaginary upright axis $A_I$. Further, as shown in FIGS. 18-24, the projection 78 further pressed against and locks to an upwardly extending portion of the lever 54 further preventing upward movement of the lever 54 toward the door opened orientation.

The various vehicle features and structures of the vehicle 10, other than the jamming bracket 36, are conventional components that are well known in the art. Since these vehicle features and structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
   an outer door panel;
   an inner door panel having an outer periphery fixed to a corresponding outer periphery of the outer door panel defining a cavity therebetween, the outer door panel and the inner door panel at least partially defining a vehicle door;

a door latch mechanism configured to retain the vehicle door in a closed orientation and in response to movement of a release lever of the door latch mechanism to a predetermined orientation the vehicle door is released for movement to an open orientation;

a reinforcement bracket having a first end fixedly attached to an upper area of the inner door panel and a second end attached to a rearward area of the inner door panel within the cavity adjacent to the door latch mechanism; and a jamming bracket fixed to an inboard side of the reinforcement bracket and extends upward from the reinforcement bracket, the jamming bracket having a locking portion that extends to an area adjacent to the release lever such that with the vehicle door in a non-deformed state the release lever is movable between an at rest orientation and the predetermined orientation, and in response to deformation of the vehicle door resulting from an exterior impact force the locking portion of the jamming bracket moves toward the release lever preventing the release lever from moving to the predetermined orientation.

2. The vehicle door assembly according to claim 1, wherein
the jamming bracket includes a first portion and a second portion, the second portion defining the locking portion and being angularly offset from the first portion defining an obtuse angle therebetween.

3. The vehicle door assembly according to claim 2, wherein
the obtuse angle is greater than 90 degrees and less than 125 degrees.

4. The vehicle door assembly according to claim 2, wherein
the jamming bracket includes an embossment that extends from a mid-portion of the second portion to an upper area of the first portion.

5. The vehicle door assembly according to claim 2, wherein
the first portion has a lower end fixedly attached to an inboard side of the reinforcement bracket.

6. The vehicle door assembly according to claim 2, wherein
the second portion extends in an inboard direction away from the reinforcement bracket such that the locking portion is adjacent to the release lever of the door latch mechanism.

7. The vehicle door assembly according to claim 6, wherein
the release lever of the door latch mechanism is formed with a rounded end, the locking portion of the jamming bracket has a distal end that is formed with a curved recess relative to the predetermined shape of the release lever such that with the vehicle door in a non-deformed state the release lever is movable through the curved recess between the at rest orientation and the predetermined orientation.

8. The vehicle door assembly according to claim 7, wherein
the reinforcement bracket is shaped and dimensioned such that in response to impact event in which impact force is proximate a mid-portion of the reinforcement bracket, the reinforcement bracket deforms causing the jamming bracket to pivot about an upright axis moving to a location above the release lever blocking upward movement of the release lever.

9. The vehicle door assembly according to claim 1, wherein
the reinforcement bracket is shaped and dimensioned such that in response to impact event in which impact force is proximate a mid-portion of the reinforcement bracket, the reinforcement bracket deforms causing the jamming bracket to pivot about an upright axis moving to a location above the release lever blocking upward movement of the release lever.

10. The vehicle door assembly according to claim 2, wherein
the first portion of the jamming bracket has a lower end welded to an inboard side of the reinforcement bracket.

11. The vehicle door assembly according to claim 1, wherein
the release lever of the door latch mechanism is formed with a rounded end, the locking portion of the jamming bracket has a distal end that is formed with a curved recess relative to the predetermined shape of the release lever such that with the vehicle door in a non-deformed state the release lever is movable through the curved recess between the at rest orientation and the predetermined orientation.

12. The vehicle door assembly according to claim 1, wherein
the door latch mechanism contacts and engages a portion of a vehicle body structure while retaining the vehicle door in the closed orientation.

* * * * *